United States Patent
Chung (10) Patent No.: US 6,496,493 B1
(45) Date of Patent: Dec. 17, 2002

(54) HANDOFF TRIAL METHOD BY A MOBILE STATION

(75) Inventor: Chae Hun Chung, Ichon (KR)

(73) Assignee: Hyundai Electronics Industries, Kyongki-Do (KR)

( * ) Notice: Subject to any disclaimer, the term of this patent is extended or adjusted under 35 U.S.C. 154(b) by 0 days.

(21) Appl. No.: 09/311,222

(22) Filed: May 13, 1999

(30) Foreign Application Priority Data

May 15, 1998 (KR) ............................................ 98-17632

(51) Int. Cl.[7] ................................................. H04Q 7/20
(52) U.S. Cl. ........................ 370/332; 370/331; 455/433; 455/436; 455/437; 455/440
(58) Field of Search ................................. 370/331, 332; 455/433, 436, 440, 437

(56) References Cited

U.S. PATENT DOCUMENTS

| | | | |
|---|---|---|---|
| 5,594,718 A | * 1/1997 | Weaver, Jr. et al. | 370/331 |
| 5,640,414 A | * 6/1997 | Blakeney, II et al. | 375/200 |
| 5,697,055 A | * 12/1997 | Gilhousen et al. | 455/33.2 |
| 5,737,704 A | 4/1998 | Jin et al. | 455/450 |
| 5,982,758 A | * 11/1999 | Hamdy | 370/331 |
| 5,999,816 A | * 12/1999 | Tiedeman, Jr. et al. | 455/437 |
| 6,035,197 A | * 3/2000 | Haberman et al. | 455/439 |
| 6,038,448 A | * 3/2000 | Chheda et al. | 455/436 |
| 6,075,989 A | * 6/2000 | Moore et al. | 455/436 |
| 6,119,005 A | * 6/2000 | Smolik | 455/436 |
| 6,154,653 A | * 11/2000 | Jung | 455/442 |
| 6,321,090 B1 | * 11/2001 | Soliman | 455/440 |

* cited by examiner

*Primary Examiner*—Daniel Hunter
*Assistant Examiner*—Stephen M. D'Agosta
(74) *Attorney, Agent, or Firm*—Clark & Elbing LLP (57) ABSTRACT

A handoff trial method by a mobile station that compares a pilot power strength of a base station providing communication service to the mobile station with a pilot power strength of a neighboring base station and attempts to handoff based on the comparing results. As a result of comparing, if the difference is larger than a pilot threshold to try handoff, the mobile station transmits a signal measurement message to the service base station for handoff to the neighboring base station. Also, if the mobile station communicated with a plurality of base stations tries to cut calls with the base stations, the mobile station measures pilot power strengths of the service base stations compares therebetween. As a result of the comparing, if the difference is smaller than a pilot threshold to cut call, the mobile station tries to cut call with the associated base station. The method has the effects that can reduce occurrence frequency of handoff, power consumption of the mobile station and signal processing loads of the service base station.

6 Claims, 6 Drawing Sheets

HANDOFF TRIAL METHOD BY A MOBILE STATION

FIELD OF THE INVENTION

This invention relates to a handoff method of a cellular communication system, a personal communication system and a satellite communication system using a Code Division Multiple Access (CDMA) system, more particularly to a handoff trial method by a mobile station that compares a pilot power strength of a base station providing communication service to the mobile station with a pilot power strength of a neighboring base station and tries handoff based on the comparing results.

BACKGROUND OF THE INVENTION

In a mobile communication system, service area of a mobile station may be changed according to moving of the mobile station. The service area, a cell may be classified according to a pilot offset and a pilot power strength to be outputted through a pilot channel, in which the pilot offset and the pilot power strength differentiate the pilot channel. Therefore whether a mobile station situated at a cell border region crossing two cell belongs to any one out of the two base station service area may be recognized by detecting a received pilot power strength having a pilot offset of the mobile station transmitted to associated base station. Also, even if the mobile station moves in inter-cell, as it is necessary to provide communication service to the mobile station without corruption, handoff that automatically changes over communication line in inter-cell moving of the mobile station to sequentially provide communication service must be performed.

Figure 1:
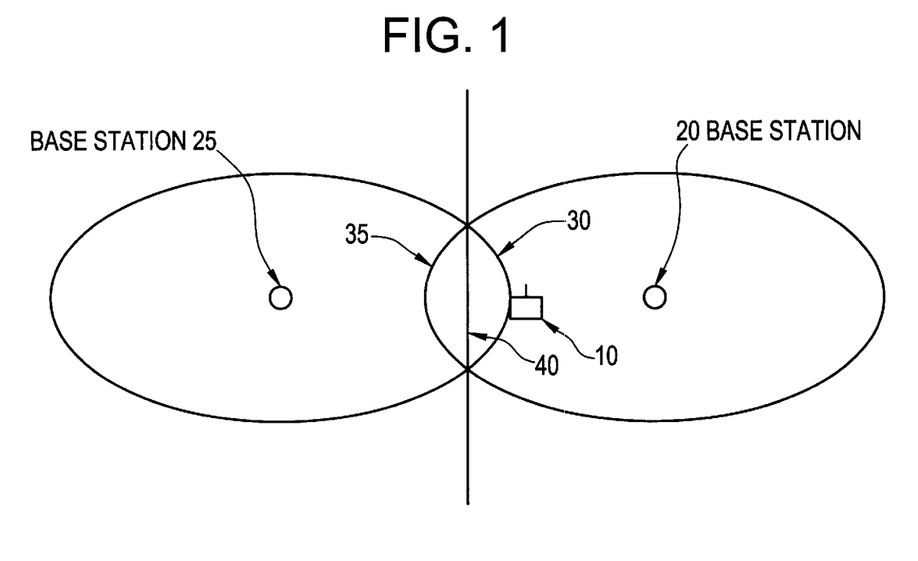
FIG. 1 is a border diagram of handoff between two base stations in a general mobile communication system.

Referring to FIG. 1, there is shown a border diagram of handoff between two base stations in a general mobile communication system.

In the drawing, the reference number 10 designates a mobile station for receiving communication service while moving, the reference number 20 designates a base station for providing communication service to the mobile station 20, reference number 25 designates other base station neighboring the base station 20 and reference number 30 designates a border that is in the cell (right oval) of the base station 20 while the cell (left oval) of the base station 25 originates. In addition, the reference number 35 designates border that is in the cell (left oval) of the base station 25 while the cell (right oval) of the base station 20 originates and the reference number 40 designates border that the base station 20 has the same pilot power strength as the base station 25.

Figure 2:
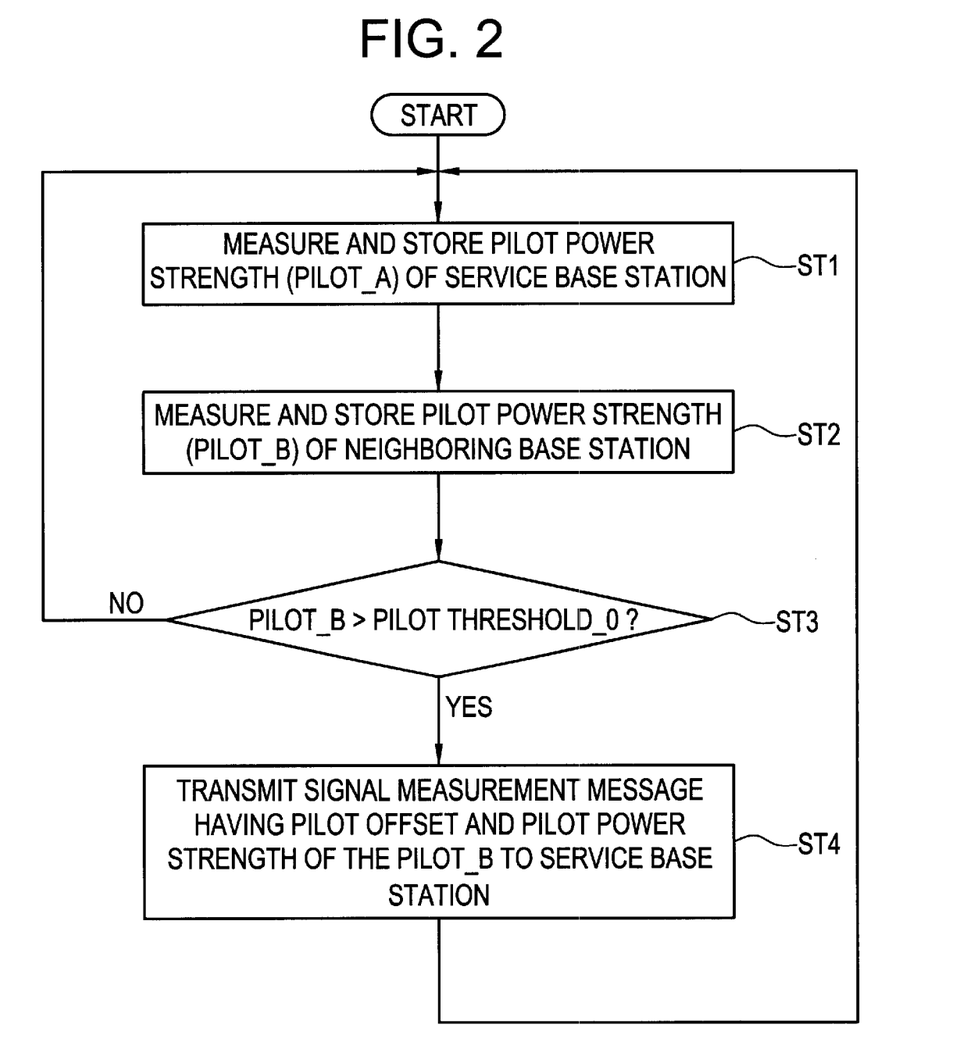
FIG. 2 is a flowchart for general method that the mobile station tries handoff in situation of FIG. 1.

In FIG. 2 there is illustrated a flowchart for general method that the mobile station 10 tries handoff in situation of FIG. 1. Handoff procedure of the prior art of FIG. 2 will be explained in conjugation with the FIG. 1

First of all, when the mobile station 10 has been in the cell of the base station 20 that provides communication service to the mobile station 10 and is gradually moving to the border 30, the mobile station 10 measures and stores a pilot power strength (pilot_A) of the base station 20 and a pilot power strength (pilot_B) of the base station 25(ST1–ST2). Then the mobile station 10 compares the pilot_B with pilot threshold_0 that is an absolute value set itself to try handoff (ST3). With the result that, if the pilot_B is larger than the pilot threshold_0, the mobile station 10 transmits a signal measurement message having the pilot offset and power strength of the pilot_B to the service base station 20 to try handoff to the base station 25(ST4). The signal measurement message is transmitted in sequence to the base station 20 until the mobile station 10 moves in sequence to the cell region of the base station 25 and the handoff will have completed. Otherwise, if the pilot_B is smaller than the pilot threshold_0, flow returns to the ST1 in FIG. 2.

Meanwhile, when the mobile station 10 has been in the cell of the base station 25, which provides communication service to the mobile station 10, and is gradually moving to the border 35, the mobile station 10 measures and stores the pilot power strength of the base station 20. If the measured pilot power strength of the base station 20 is larger than a pilot threshold set to the mobile station 10 to try handoff, the mobile station 10 transmits a signal measurement message having the pilot power strength of the service base station 25 to try handoff to the base station 20. As described in the above, each handoff region of the base stations 20 and 25 is between the border 30 and border 35.

Accordingly, it is noted in the handoff method of the prior art that the pilot power strength of neighboring base station is only inspected without inspecting the pilot power strength of service base station. If the pilot power strength of neighboring base station is larger than the pilot threshold set to the mobile station to try handoff, the mobile station unconditionally sends the signal measurement message for handoff to the base station. Although handoff isn't needed as the pilot power strength of the service base station is enough to provide communication service, handoff will be tried if the above condition is satisfied.

Therefore, the handoff trial method of the mobile station in the prior art have to send the signal measurement message to the service base station at broad inter-cell region such as region between the border 30 and border 35 in FIG. 1, which causing to increase power consumption to handoff. Further, as handoff region is broad, the prior art has the problem in that the base station has much loads to process the signal measurement message received from the mobile station and use many channels due to frequent handoff.

U.S. Pat. No. 5,737,704 discloses channel allocation method for reducing inter-cell hard handoffs in a CDMA system which divides a service area into a plurality of cells and allocates a channel to each cell. The '704 patent comprises a first step of dividing a cell into a plurality of concentric circle regions, a second step for allocating a first channel not allocated to a neighboring cell, a third step of allocating a second channel allocated to the neighboring cell to the outermost concentric circle region of the cell and a forth step of allocating the first and second channels allocated by the second step and third step to a middle concentric circle region of the cell region. Also, the first and second region is selectively varied in order to reduce handoff.

The U.S. Patent shows a method that divides a service area into several cells by Round Trip Delay and allocates one channel to each cell, in which a cell is divided into 3 parts of an innermost concentric circle region, a middle concentric circle region and an outermost concentric circle region, channels of innermost and outermost regions being allocated to the middle concentric circle region, so as to reduce handoff by means of cell dividing method. The method, however, disadvantages in that has complex procedures such as dividing one cell into several regions and measuring RTD several times.

SUMMARY OF THE INVENTION

Again referring to FIG. 1, standing at the border 40 of forward handoff, the mobile station 10 receives same pilot power strengths from the base stations 20 and 25, but receives pilot power strength larger by a predetermined value from the base station 20 at the cell border 30. Thus, comparing the pilot power strength of service base station 20 with that of the neighboring base station 25, we could find where the mobile station 10 stands. This inventor pays attention to the above point to solve the prior art problem.

It is therefore an object of the present invention to provide a handoff trial method by a mobile station which measures and stores a pilot power strength of a base station providing communication service to the mobile station, measures a pilot power strength of a neighboring base station and compares the stored pilot power strength of the service base station with the measured pilot power strength of the neighboring base station to try handoff according to the comparing result and to reduce occurrence frequency of handoff, and thereby to reduce power consumption of the mobile station and signal processing loads of the service base station.

According to a first aspect of the invention, the above object is achieved by a handoff trial method by a mobile station comprising the steps of: a first step of measuring and storing a pilot power strength (pilot_A) of a base station on service; a second step of measuring and storing a pilot power strength (pilot_B) of a neighboring base station; a third step of comparing the sum of the pilot_A and pilot threshold_1 set to the mobile station to try handoff with the pilot_B; a forth step of, if the pilot_B is larger than the sum of the pilot_A and pilot threshold_1 as a result of the comparing, storing associated pilot offsets out of the pilot_B at predetermined times and counting the stored times; a fifth step of identifying whether the counting times reaches at a predetermined times to detect a pilot signal suited for handoff condition; a sixth step of, if the counting times reaches at the predetermined times as a result of the identifying, identifying whether the stored pilot offsets are all the same; and a seventh step of, if the pilot offsets are all the same as a result of the identifying, sending a signal measurement message having the stored pilot offsets and associated pilot power strengths to the service base station and requesting handoff therefrom.

Other object of the present invention is to provide a handoff trial method by a mobile station which measures and stores pilot power strengths of more than two base stations providing communication service to the mobile station, measures pilot power strengths of neighboring base stations and compares the least pilot power strength out of the stored pilot power strengths with the measured pilot power strengths of the neighboring base stations to try handoff according to the comparing result and to reduce occurrence frequency of handoff, and thereby to reduce power consumption of the mobile station and signal processing loads of the service base stations According to a second aspect of the invention, the above object is achieved by a handoff trial method by a mobile station comprising the steps of: a first step of measuring and storing pilot power strengths of a plurality of base stations on service; a second step of measuring and storing pilot power strengths (pilot_B') of neighboring base stations; a third step of selecting the least pilot power strength (pilot_C) out of the stored pilot power strengths and comparing the sum of the pilot_C and pilot threshold_2 set to the mobile station to try handoff with the pilot_B'; a forth step of, if the pilot_B' is larger than the sum of the pilot_C and pilot threshold_2 as a result of the comparing, storing associated pilot offsets out of the pilot_B' at predetermined times and counting the stored times; a fifth step of identifying whether the counting times reaches at a predetermined times to detect a pilot signal suited for handoff condition; a sixth step of, if the counting times reaches at the predetermined times as a result of the identifying, identifying whether the stored pilot offsets are all the same; and a seventh step of, if the pilot offsets are all the same as a result of the identifying, sending a signal measurement message having the stored pilot offsets and associated pilot power strengths to the service base stations and requesting handoff therefrom.

Another object of the present invention is to provide a handoff trial method by a mobile station which measures and stores pilot power strengths of more than two base stations providing communication service to the mobile station and compares the stored pilot power strengths each other to try call-cut according to the comparing result and to reduce occurrence frequency of handoff, and thereby to reduce power consumption of the mobile station and signal processing loads of the service base stations According to a third aspect of the invention, the above object is achieved by a handoff trial method by a mobile station comprising the steps of: a first step of measuring and storing pilot power strengths of a plurality of base stations on service; a second step of selecting the largest pilot power strength (pilot_D) out of the stored pilot power strengths and comparing a value that subtracts pilot threshold_3 set to the mobile station to try handoff from the pilot_D with each remaining pilot power strength (pilot_E), except for the biggest pilot power strength; a third step of, if there is a pilot power strength smaller than the subtracted value as a result of the comparing, storing associated pilot offsets of the pilot power strength at predetermined times and counting the stored times; a forth step of identifying whether the counting times reaches at a predetermined times to detect a pilot signal suited for handoff condition; a fifth step of, if the counting times reaches at the predetermined times as a result of the identifying, identifying whether the stored pilot offsets are all the same; and a sixth step of, if the pilot offsets are all the same as a result of the identifying, sending a signal measurement message having the stored pilot offsets and associated pilot power strengths to the service base stations and requesting handoff for call-cut therefrom.

BRIEF DESCRIPTION OF THE DRAWINGS

The invention disclosed herein will be understood better with reference to the following drawing of which.

DETAILED DESCRIPTION OF THE PREFERRED EMBODIMENTS

Hereinbelow, detailed embodiments of a handoff trial method by a mobile station of the present invention will be described in detail with reference to accompanying drawings.

Figure 3:
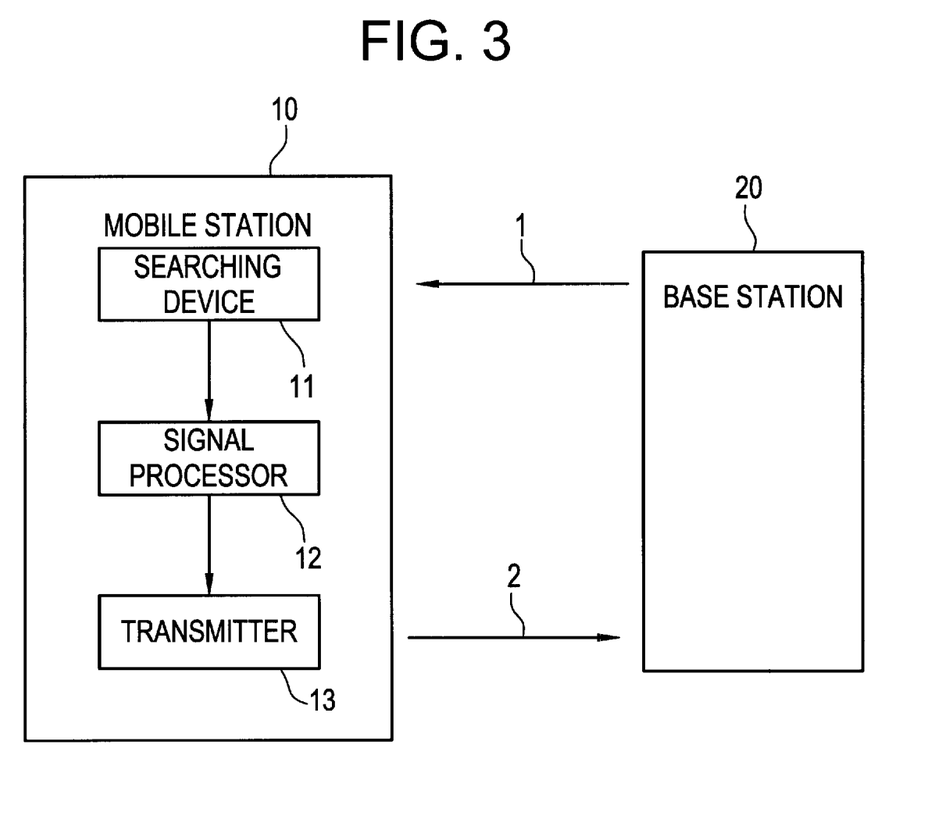
FIG. 3 is a block diagram for a mobile station and a base station applied to the present invention.

FIG. 3 is a block diagram for a mobile station and a base station applied to the method of the present invention As shown in the drawing, a mobile station 10 comprises a searching device 11, a signal processor 12 and a transmitter 13. Also, the mobile station 10 receives a pilot signal from the base station 20 and sends a signal measurement message thereto.

The searching device 11 searches the pilot signal from the base station 20 and calculates an offset and power strength of the pilot signal. The signal processor 12 stores the calculated pilot offset and power strength, compares the pilot power strength with a pilot power strength of a neighboring base station and transmits a signal measurement message having associated pilot offset and power strength to the transmitter 13 if the a condition for trying handoff or call-cut is satisfied. Also, the transmitter 13 transmits the signal measurement message from the signal processor 12 to the base station 20.

Figure 4:
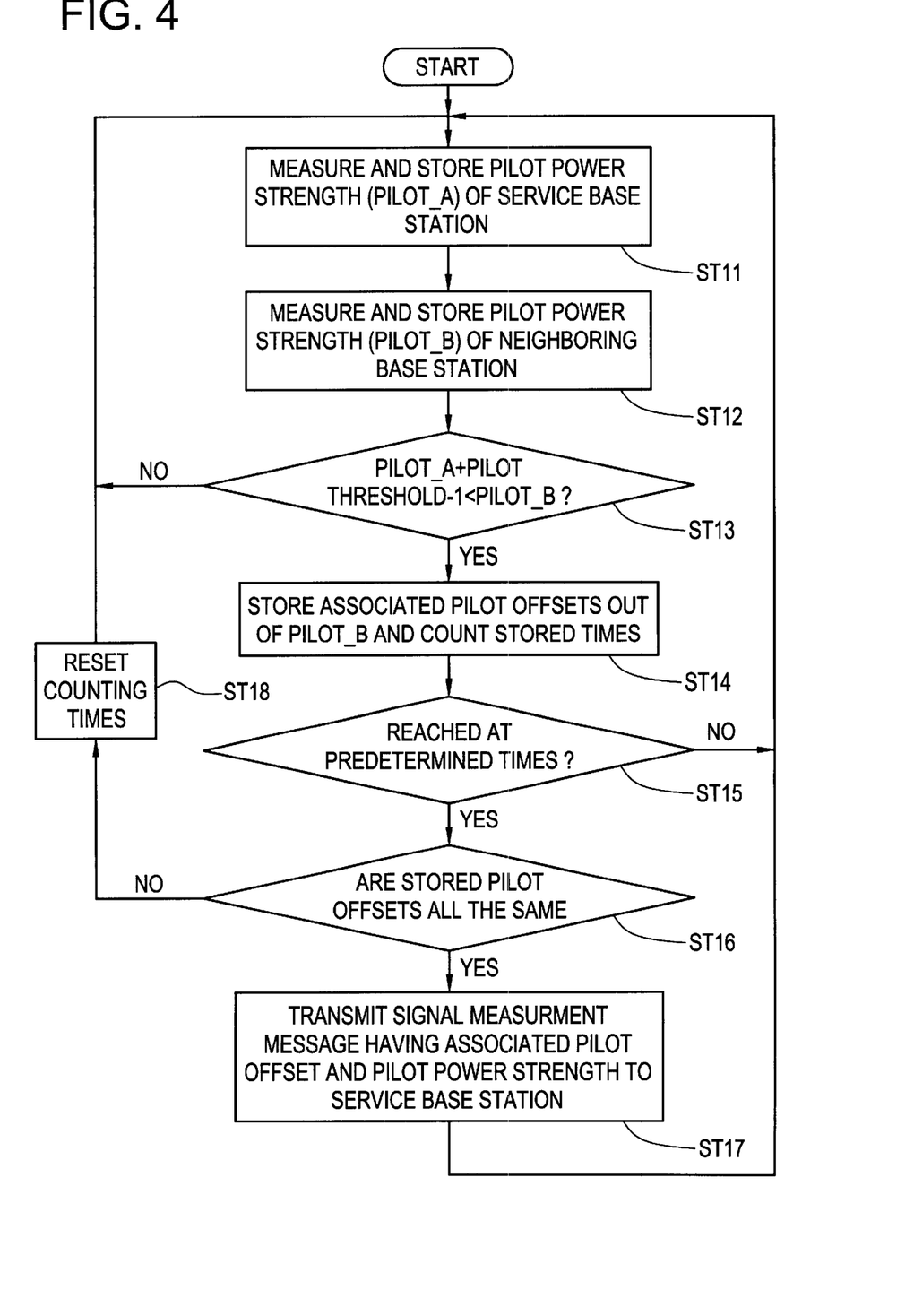
FIG. 4 is a flowchart for a method according to one embodiment of the present invention that a mobile station communicated with a base station tries handoff to a new base station.

Referring to FIG. 4, there is shown a flowchart for a method according to one embodiment of the present invention that a mobile station communicated with a base station tries handoff to a new base station.

Now, operation of the method will be described in conjugation with FIGS. 3 and 4.

First of all, the searching device 11 searches the base station 20 and the neighboring base station (not shown). Then, the searching device 11 calculates an offset and power strength (pilot__A) of a pilot signal of the base station 20 and sends the same to the signal processor 12. Further the searching device 11 calculates an offset and power strength (pilot__B) of a pilot signal of the neighboring base station and sends the same to the signal processor 12.

Then the signal processor 12 stores the pilot__A and the pilot__B from the searching device 11(ST11–ST12). Here ST shows step. The signal processor 12 adds "pilot threshold__1" set thereto to try handoff to the pilot__A and compares the added value with the pilot__B from the searching device 11(S13). As a result of the comparing, if the pilot__B is smaller than the sum of the pilot__A and pilot threshold__1, flow returns to S11. Otherwise, if the pilot__B is larger than the sum, the signal processor 12 stores associated pilot offsets out of the pilot__B at predetermined times and counts the stored times by driving a timer(not shown) (S14).

Then the signal processor 12 identifies whether the counting times reaches at a predetermined times stored thereto to detect a pilot signal suited for handoff condition (ST15). As a result of the identifying, if the counting times reaches at the predetermined times, flow returns to ST11. The searching device 11 re-measures the pilot power strength of the base station and the pilot power strength of the neighboring base station (ST11–ST12). The signal processor. 12 compares the added value with the pilot__B from the searching device 11. As a result of the comparing, if there is a pilot power strength larger than the sum, the signal processor 12 stores the associated pilot offsets at predetermined times and counts the stored times by driving the timer (ST13–ST14). These processes are repeated until the set times to detect pilot offset that is able to handoff. The set times may be the optimum value to try handoff.

In the step 15, if the counting times reaches at the set times, the mobile station 10 identifies whether the stored pilot offsets are all the same (ST16). If the pilot offsets are not all the same as a result of the identifying, the signal processor 12 resets (ST18) the counting number and flow returns to the step 11.

Otherwise, if the pilot offsets are all the same, the transmitter 13 sends a signal measurement message having the stored pilot offsets and associated pilot power strengths to the service base station 20 and requesting handoff therefrom (ST17).

According to the one aspect, the present invention transmits the signal measurement message to try handoff to the base station 20 with the result of comparing the pilot power strength of the service base station 20 with the neighboring base station to prevent the mobile station from sending even if the service base station has a sufficient pilot power strength to provide communication service to the mobile station and thereby to reduce message transmitting frequency to the base station 20 and prevent power consumption. In addition, the present invention is able to reduce the process load for the signal measurement message.

Again referring to FIG. 1, when the mobile station 10 has been in the cell of the base station 20 that provides communication service to the mobile station 10 and moves to the cell of the base station 25, it transmits the signal measurement message to try handoff to the service base station 20 from the border 30 in the prior art. In the present invention, however, the mobile station 10 transmits the signal measurement message to the base station 20 beyond the border 30. Thus handoff area may be between borders 30 and 40. In detail, it is determined whether the mobile station 10 transmits the signal measurement message to the base station 20 from any position beyond the border 30 according to how to set the pilot threshold__1. As the result of that, the handoff area is shortened to reduce handoff occurring frequency.

Figure 5:
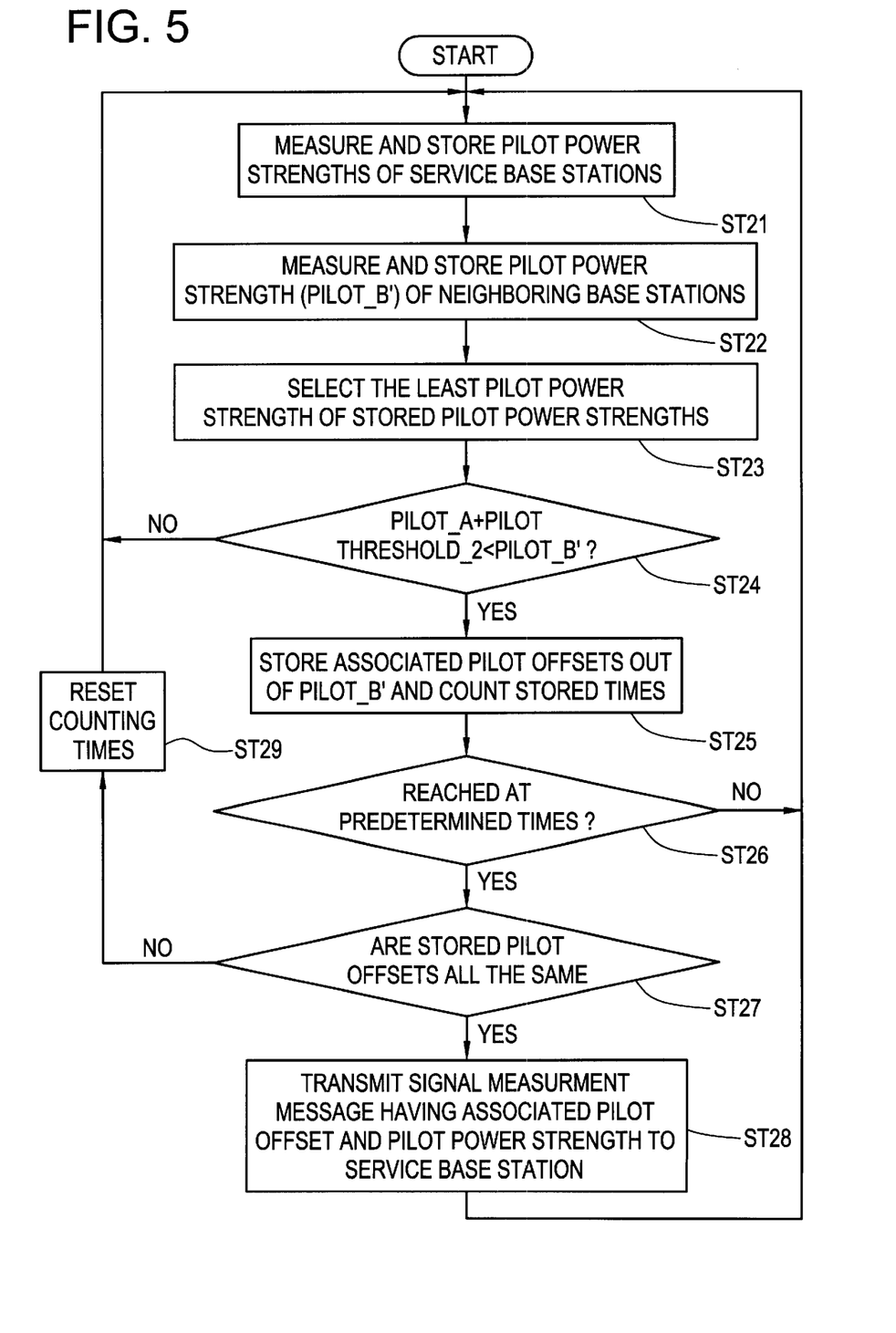
FIG. 5 is a flowchart for a method according to other embodiment of the present invention that a mobile station communicated with more than two base stations tries handoff to a new base station.

FIG. 5 a flowchart for a method according to the present invention that a mobile station communicated with more than two base stations tries handoff to a new base station.

Now, operation of the method will be described in conjugation with FIGS. 3 and 5.

The searching device 11 of the mobile station 10 measures of pilot power strengths of more than two base stations (not shown) on service and sends the measured value to the signal processor 12, which stores the same thereto (ST 21). Also, the searching device 11 measures pilot power strengths of (pilot__B') neighboring base stations (not shown), sends the measured value to the signal processor 12, which stores the same thereto (ST 22), and selects the least pilot power strength ( pilot__C) out of the pilot strengths of the service base stations (ST23). Then the signal processor 12 adds "pilot threshold__2" set thereto to try handoff to the pilot__C and compares the added value with the pilot__B' from the searching device 11(ST 24). As a result of the comparing, if the pilot__B' is smaller than the sum of the pilot__C and pilot threshold__2, flow returns to S21. Otherwise, if the pilot__B' is larger than the sum, i.e. if there is a pilot power larger than the sum strength, the signal processor 12 stores associated pilot offsets out of the pilot__B' at predetermined times and counts the stored times by driving a timer (not shown) (ST25).

Further the signal processor 12 identifies whether the counting times reaches at a predetermined times stored thereto to detect pilot signal suited for handoff condition (ST26). As a result of the identifying, if the counting times reaches at the predetermined times, flow returns to ST21. The processes to ST 25 are repeated until the set times to detect pilot offset that is able to handoff.

If the counting times reaches at the set times, the mobile station 10 identifies whether the stored pilot offsets are all the same (ST27). If the pilot offsets are not all the same as a result of the identifying, the signal processor 12 resets (ST29) the counting number and flow returns to the step 21.

Otherwise, if the pilot offsets are all the same, the transmitter 13 sends a signal measurement message having the stored pilot offsets and associated pilot power strengths to the service base station 20 and requests handoff therefrom (ST 28).

On the one hand, in the ST23, the largest one may be selected instead of the least pilot power strength. In this case, other pilot threshold is set to the signal processor.

According to the other aspect, the present invention transmits the signal measurement message to try handoff to the base station 20 with the result of comparing the pilot power strength of the service base stations with the neighboring base stations to reduce the process load for the signal measurement message, handoff area and handoff occurring frequency and prevent channel loss.

Figure 6:
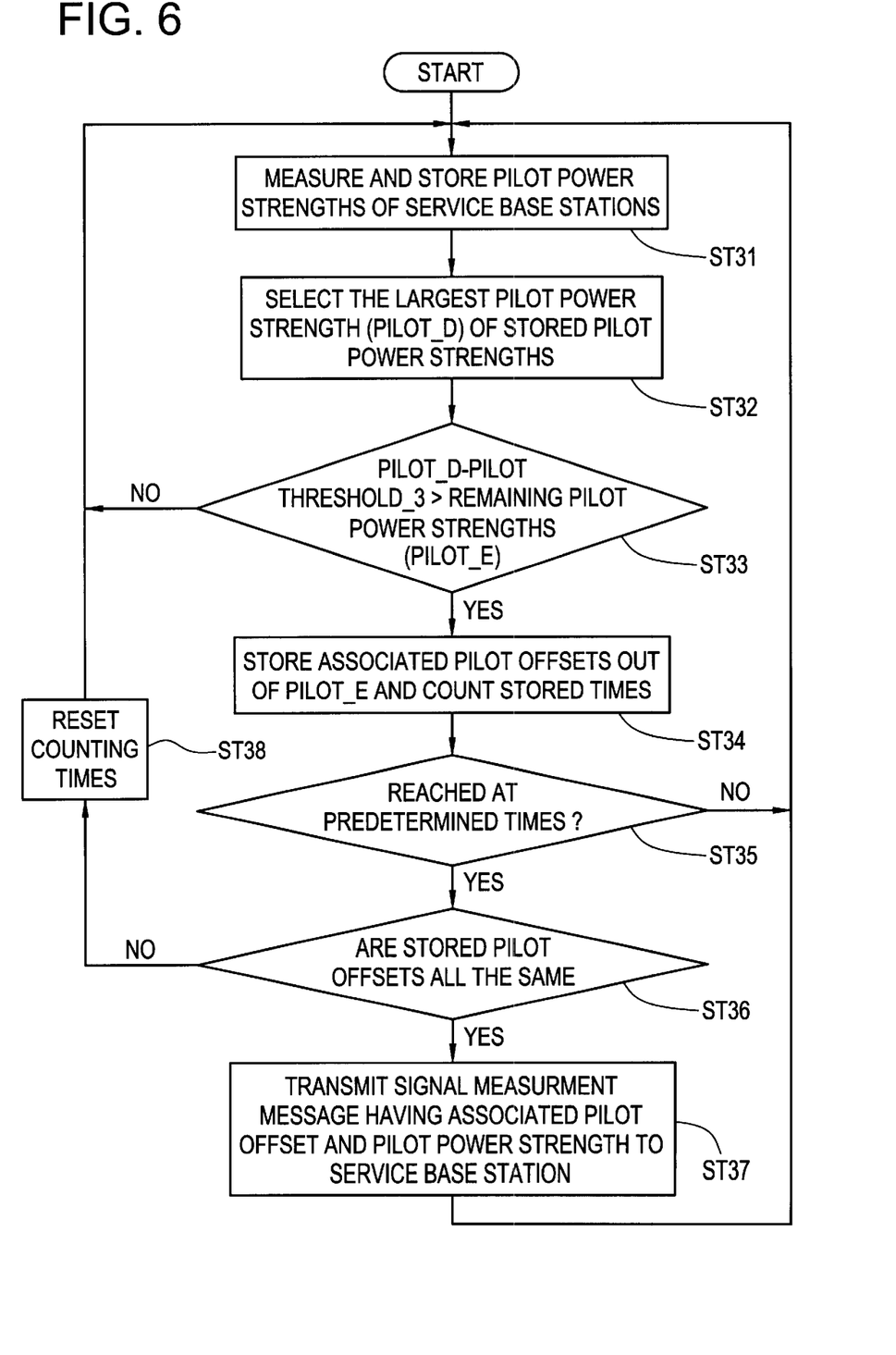
FIG. 6 is a flowchart for a method according to another embodiment of the present invention that a mobile station communicated with more than two base station tries call-cut.

Referring to FIG. 6, there is shown a flowchart for a method according to another embodiment of the present invention that a mobile station communicated with more than two base station tries call-cut.

Now, operation of the method will be described in conjugation with FIGS. 3 and 6.

The searching device 11 of the mobile station 10 measures and sends pilot power strengths of more than two base stations on service to the signal processor 12, which stores the same thereto(ST31). The signal processor 12 selects the largest pilot power strength (pilot_D) out of the stored pilot power strengths (ST 32) and compares a value that subtracts pilot threshold_3 set to a mobile station 10 to try handoff from the pilot_D with each remaining pilot power strength (pilot_E), except for the largest pilot power strength (ST33).

If there is a pilot power strength smaller than the subtracted value as a result of the comparing, the signal processor 12 stores associated pilot offsets out of the pilot_E at predetermined times and counts the stored times by driving a timer (not shown) (ST34). Otherwise, flow returns to ST 31.

Further the signal processor 12 identifies whether the counting times reaches at a predetermined times stored thereto to detect pilot signal suited for handoff condition (ST35). As a result of the identifying, if the counting times reaches at the predetermined times, flow returns to ST31. The processes to ST 34 are repeated until the set times to detect pilot offset that is able to cut call.

If the counting times reaches at the set times, the mobile station 10 identifies whether the stored pilot offsets are all the same (ST36). If the pilot offsets are not all the same as a result of the identifying, the signal processor 12 resets (ST38) the counting number and flow returns to the step 31.

Otherwise, if the pilot offsets are all the same, the transmitter 13 sends a signal measurement message having the stored pilot offsets and associated pilot power strengths to the service base station 20 and requests call-cut therefrom (ST 37).

According to the another aspect, the present invention detects the pilot power strength smaller above the pilot threshold_3 than the largest pilot power strength out of the pilot power strengths of more than two base stations, transmits the signal measurement message to cut call for the associated base station to the base station 20 to reduce the process load for the signal measurement message, handoff area and handoff occurring frequency and prevent channel loss.

As described hereinabove, the present invention measures and stores the pilot power strength of the service base station providing communication service to the mobile station, measures the pilot power strength of the neighboring base station and compares the stored pilot power strength of the service base station with the measured pilot power strength of the neighboring base station to try handoff according to the comparing result and to reduce occurrence frequency of handoff, and thereby to reduce power consumption of the mobile station and signal processing loads of the service base station as well as to prevent channel loss thereof.

It is further understood by those skilled in the art that the foregoing description are preferred embodiments of the disclosed method and that various changes and modifications may be made in the invention without departing from the spirit and scope thereof.

What is claimed is:

1. Handoff trial method by a mobile station comprising the steps of: a first step of measuring and storing a pilot power strength (pilot_A) of a base station on service; a second step of measuring and storing a pilot power strength (pilot_B) of a neighboring base station; a third step of comparing the sum of the pilot_A and pilot threshold_1 set to the mobile station to try handoff with the pilot_B; a forth step of, if the pilot_B is larger than the sum of the pilot_A and pilot threshold_1 as a result of the comparing, storing associated pilot offsets out of the pilot_B at a predetermined times and counting the stored times; a fifth step of identifying whether the counting times reaches at a predetermined times to detect a pilot signal suited for handoff condition; a sixth step of, if the counting times reaches at the predetermined times as a result of the identifying, identifying whether the stored pilot offsets are all the same; and a seventh step of, if the pilot offsets are all the same as a result of the identifying, sending a signal measurement message having the stored pilot offsets and associated pilot power strengths to the service base station and requesting handoff therefrom.

2. Handoff trial method by a mobile station as claimed in claim 1, in which comprises the steps of returning to the step 1 if the sum of the pilot_A and pilot threshold_1 is larger than the pilot_B as a result of the comparing of said third step and the counting times does not reach at the predetermined times as a result of the identifying of said fifth step, and resetting the counting times and returning to step 1 if the pilot offsets are not all the same as a result of the identifying of said sixth step.

3. Handoff trial method by a mobile station comprising the steps of: a first step of measuring and storing pilot power strengths of a plurality of base stations on service; a second step of measuring and storing pilot power strengths (pilot_B') of neighboring base stations; a third step of selecting the least pilot power strength (pilot_C) out of the stored pilot power strengths and comparing the sum of the pilot_C and pilot threshold_2 set to the mobile station to try handoff with the pilot_B'; a forth step of, if the pilot_B' is larger than the sum of the pilot_C and pilot threshold_2 as a result of the comparing, storing associated pilot offsets out of the pilot_B' at a predetermined times and counting the stored times; a fifth step of identifying whether the counting times reaches at a predetermined times to detect a pilot signal suited for handoff condition; a sixth step of, if the counting times reaches at the predetermined times as a result of the identifying, identifying whether the stored pilot offsets are all the same; and a seventh step of, if the pilot offsets are all the same as a result of the identifying, sending a signal measurement message having the stored pilot offsets and associated pilot power strengths to the service base stations and requesting handoff therefrom.

4. Handoff trial method by a mobile station as claimed in claim 3, in which comprises the steps of returning to the step 1 if the sum of the pilot_A and pilot threshold_1 is larger than the pilot_B as a result of the comparing of said third step and the counting times does not reach at the predetermined times as a result of the identifying of said fifth step, and resetting the counting times and returning to step 1 if the pilot offsets are not all the same as a result of the identifying of said sixth step.

5. Handoff trial method by a mobile station comprising the steps of: a first step of measuring and storing pilot power strengths of a plurality of base stations on service; a second step of selecting the largest pilot power strength (pilot_D) out of the stored pilot power strengths and comparing a value that subtracts pilot threshold_3 set to the mobile station to try handoff from the pilot_D with each remaining pilot power strength (pilot_E), except for the largest pilot power strength; a third step of, if there is a pilot power strength smaller than the subtracted value as a result of the comparing, storing associated pilot offsets of the pilot power strength at a predetermined times and counting the stored times; a forth step of identifying whether the counting times reaches at a predetermined times to detect a pilot signal suited for handoff condition; a fifth step of, if the counting times reaches at the predetermined times as a result of the identifying, identifying whether the stored pilot offsets are all the same; and a sixth step of, if the pilot offsets are all the same as a result of the identifying, sending a signal measurement message having the stored pilot offsets and associated pilot power strengths to the service base stations and requesting handoff for call-cut therefrom.

6. Handoff trial method by a mobile station as claimed in claim 5, in which comprises the steps of returning to the step 1 if there isn't a pilot power strength smaller than the subtracted value as a result of the comparing of said second step and the counting times does not reach at the predetermined times as a result of the identifying of said forth step and resetting the counting times and returning to step 1 if the pilot offsets are not all the same as a result of the identifying of said fifth step.

* * * * *